United States Patent
Colgrove et al.

(10) Patent No.: US 10,545,676 B1
(45) Date of Patent: Jan. 28, 2020

(54) PROVIDING HIGH AVAILABILITY TO CLIENT-SPECIFIC APPLICATIONS EXECUTING IN A STORAGE SYSTEM

(71) Applicant: Pure Storage, Inc., Mountain View, CA (US)

(72) Inventors: John Colgrove, Los Altos, CA (US); Lydia Do, Raleigh, NC (US); Ethan Miller, Santa Cruz, CA (US); Terence Noonan, Vadnais Heights, MN (US)

(73) Assignee: Pure Storage, Inc., Mountain View, CA (US)

( * ) Notice: Subject to any disclaimer, the term of this patent is extended or adjusted under 35 U.S.C. 154(b) by 29 days.

(21) Appl. No.: 15/727,962

(22) Filed: Oct. 9, 2017

Related U.S. Application Data

(63) Continuation of application No. 15/141,478, filed on Apr. 28, 2016, now Pat. No. 9,811,264.

(51) Int. Cl.
*G06F 3/06* (2006.01)
*G06F 9/50* (2006.01)

(52) U.S. Cl.
CPC ............ *G06F 3/061* (2013.01); *G06F 3/0629* (2013.01); *G06F 3/0662* (2013.01); *G06F 3/0683* (2013.01); *G06F 9/5038* (2013.01)

(58) Field of Classification Search
CPC ...... G06F 3/061; G06F 3/0629; G06F 3/0662; G06F 3/0683; G06F 9/5038; G06F 9/5077; G06F 13/10
USPC .................................................. 711/154, 162
See application file for complete search history.

(56) References Cited

U.S. PATENT DOCUMENTS

| | | |
|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |

(Continued)

FOREIGN PATENT DOCUMENTS

| | | |
|---|---|---|
| EP | 0725324 A2 | 8/1996 |
| WO | WO-2012/087648 A1 | 6/2012 |

(Continued)

OTHER PUBLICATIONS

International Search Report and Written Opinion, PCT/US2017/012460, dated Apr. 19, 2017, 12 pages.

(Continued)

*Primary Examiner* — Gary J Portka

(57) ABSTRACT

Deploying client-specific applications in a storage system utilizing redundant system resources, including: identifying a redundant controller in the storage system, wherein the storage system includes at least a first controller and the redundant controller; and executing one or more applications on the redundant controller, wherein the one or more applications are executed in a container.

17 Claims, 9 Drawing Sheets

(56) References Cited

U.S. PATENT DOCUMENTS

| | | |
|---|---|---|
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,359,440 B2 | 1/2013 | Inomata et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,507,532 B1 | 11/2016 | Colgrove et al. |
| 9,910,618 B1 * | 3/2018 | Curley ................ G06F 11/2092 |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0067162 A1 | 3/2013 | Jayaraman et al. |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |

FOREIGN PATENT DOCUMENTS

| | | |
|---|---|---|
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |

(56) References Cited

FOREIGN PATENT DOCUMENTS

| WO | WO-2016/195958 A1 | 12/2016 |
|---|---|---|
| WO | WO-2016/195961 A1 | 12/2016 |

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS '08), Oct. 2008, 10 pages, ACM New York, NY, USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 17 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

\* cited by examiner

PROVIDING HIGH AVAILABILITY TO CLIENT-SPECIFIC APPLICATIONS EXECUTING IN A STORAGE SYSTEM

CROSS REFERENCE TO RELATED APPLICATION

This application is a continuation application of U.S. patent application Ser. No. 15/141,478, filed Apr. 28, 2016.

BACKGROUND

Technical Field

The field of the invention is data processing, or, more specifically, methods, apparatus, and products for deploying client-specific applications in a storage system utilizing redundant system resources.

Background Art

Modern storage systems can be used to provide storage resources for a wide range of clients in a wide range of industries. Each client may desire that certain features or capabilities be deployed on their storage systems, based on the specific needs of each client. Deploying such features and capabilities, however, requires that some resources of the storage system be utilized to deploy such features and capabilities. The storage system resources that are utilized to support the deployment of such features and capabilities, however, may not be utilized to support the standard operations of the storage system, such as servicing reads and writes.

SUMMARY OF INVENTION

Methods, apparatuses, and products for deploying client-specific applications in a storage system utilizing redundant system resources, including: identifying a redundant controller in the storage system, wherein the storage system includes at least a first controller and the redundant controller; and executing one or more applications on the redundant controller, wherein the one or more applications are executed in a container.

The foregoing and other objects, features and advantages of the invention will be apparent from the following more particular descriptions of example embodiments of the invention as illustrated in the accompanying drawings wherein like reference numbers generally represent like parts of example embodiments of the invention.

DESCRIPTION OF EMBODIMENTS

Figure 1:
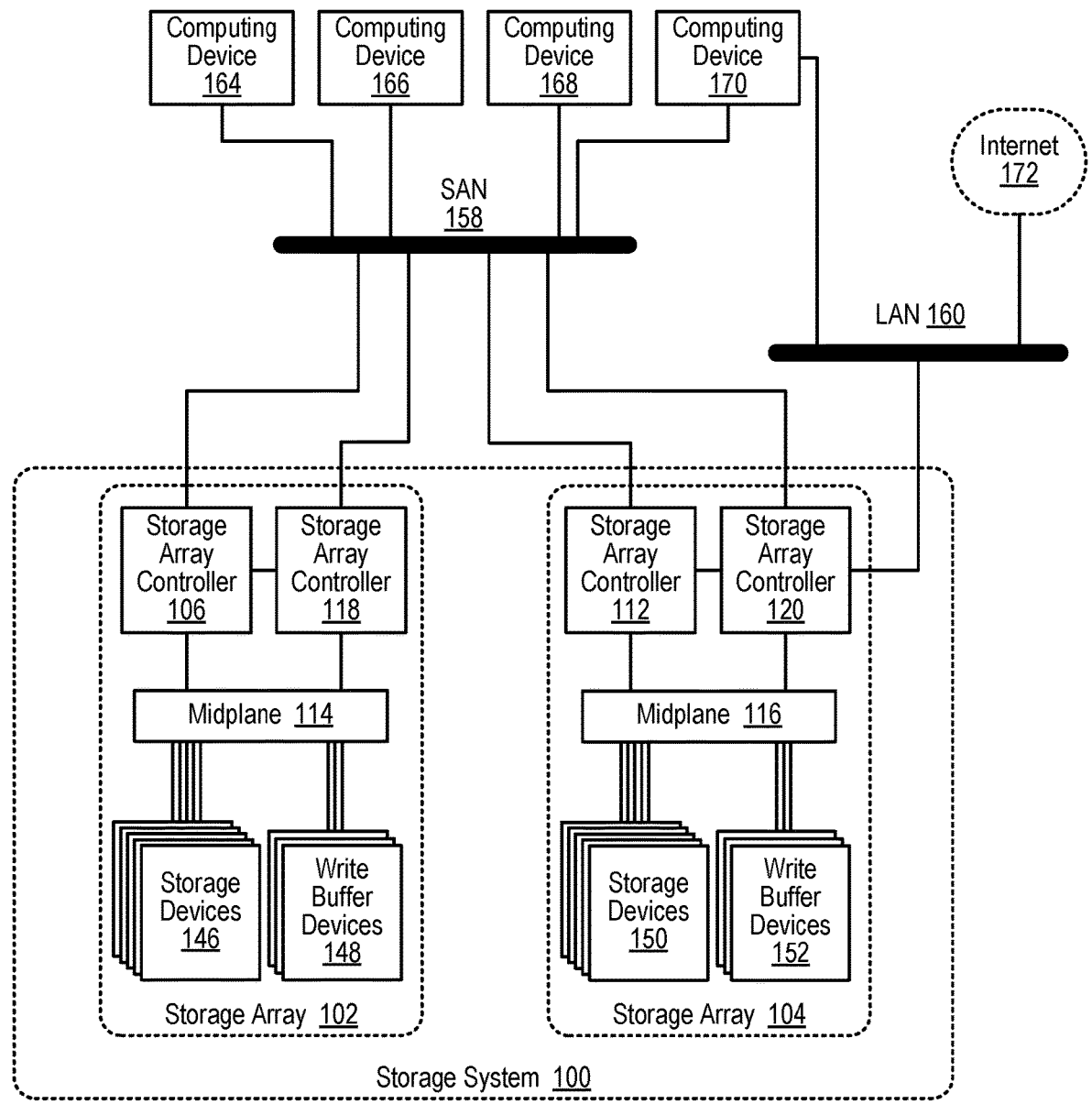
FIG. 1 sets forth a block diagram of a storage system configured for deploying client-specific applications utilizing redundant system resources according to embodiments of the present disclosure.

Example methods, apparatuses, and products for deploying client-specific applications in a storage system utilizing redundant system resources in accordance with the present invention are described with reference to the accompanying drawings, beginning with FIG. 1. FIG. 1 sets forth a block diagram of a storage system (100) configured for deploying client-specific applications utilizing redundant system resources according to embodiments of the present disclosure.

The storage system (100) depicted in FIG. 1 includes a plurality of storage arrays (102, 104), although deploying client-specific applications utilizing redundant system resources in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network (SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network (160) ('LAN'). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol (HDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array (104) is expressly depicted as being coupled to the computing devices (164, 166, 168, 170) via the LAN (160), readers will appreciate that other storage arrays (102) in the storage system (100) may also be coupled to the computing devices (164, 166, 168, 170) via the same LAN (160) or via a different LAN.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). In the example of FIG. 1, writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one or the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one or the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in deploying client-specific applications utilizing redundant system resources according to embodiments of the present disclosure. The storage array controllers (106, 112) may assist in deploying client-specific applications utilizing redundant system resources by: identifying a redundant controller in the storage system, wherein the storage system includes at least a first controller and the redundant controller; executing, within one or more containers, one or more applications on the redundant controller; executing, on the redundant controller, a virtual interface for accessing one or more storage devices in the storage system; generating, by one of the applications, an I/O operation directed to the storage system; servicing, by the redundant controller, the I/O operation via the virtual interface; determining whether a redundant controller of a second storage array can be utilized to execute one or more applications for a first storage array; executing one or more applications for the first storage array on the redundant controller of the second storage array in response to determining that the redundant controller of the second storage array can be utilized to execute one or more applications for the first storage array; determining whether the storage system is failing over from the first controller to the redundant controller; responsive to determining that the storage system is failing over from the first controller to the redundant controller: ceasing execution of one or more of the applications on the redundant controller and executing one or more of the applications on the first controller; determining, for each of a plurality of applications, a priority level; determining which applications to execute in dependence upon the priority level for each of the plurality of applications; determining which applications to execute in dependence upon one or more policies; updating software one or more of the controllers without disruption to the applications executing in the container; and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Deploying client-specific applications in a storage system utilizing redundant system resources in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (202) useful in deploying client-specific applications in a storage system utilizing redundant system resources according to embodiments of the present disclosure.

Figure 2:
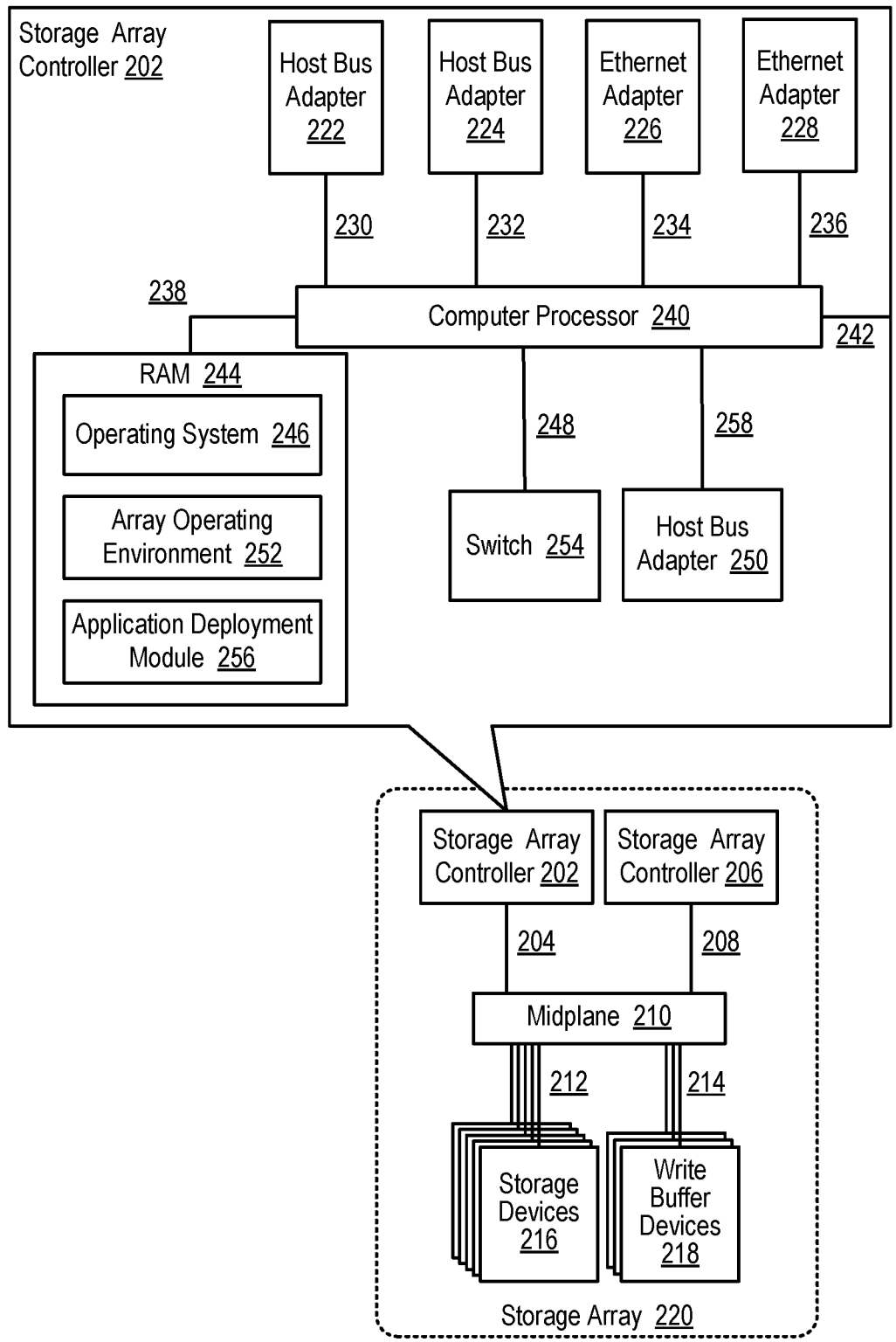
FIG. 2 sets forth a block diagram of a storage array controller useful in deploying client-specific applications in a storage system utilizing redundant system resources according to embodiments of the present disclosure.

The storage array controllers (202, 206) depicted in FIG. 2 may be similar to the storage array controllers depicted in FIG. 1, as the storage array controllers (202, 206) of FIG. 2 may be communicatively coupled, via a midplane (210), to one or more storage devices (216) and to one or more write buffer devices (218) that are included as part of a storage array (220). The storage array controllers (202, 206) may be coupled to the midplane (210) via one or more data communications links (204, 208) and the midplane (206) may be coupled to the storage devices (216) and the memory buffer devices (218) via one or more data communications links (212, 214). The data communications links (204, 208, 212, 214) of FIG. 2 may be embodied, for example, as a Peripheral Component Interconnect Express ('PCIe') bus, as a Serial Attached SCSI (SAS') data communications link, and so on. Although only one of the storage array controllers (202) is depicted in detail, readers will appreciate that other storage array controllers (206) may include similar components. For ease of explanation, however, the detailed view of one of the storage array controllers (202) will be described below.

The storage array controller (202) detailed in FIG. 2 can include at least one computer processor (240) or 'CPU' as well as random access memory ('RAM') (244). The computer processor (240) may be connected to the RAM (244) via a data communications link (238), which may be embodied as a high speed memory bus such as a Double-Data Rate 4 ('DDR4') bus. Although the storage array controller (202) detailed in FIG. 2 includes only a single computer processor, however, readers will appreciate that storage array controllers useful in deploying client-specific applications in a storage system utilizing redundant system resources according to embodiments of the present disclosure may include additional computer processors. Likewise, although the storage array controller (202) detailed in FIG. 2 includes only a RAM (244), readers will appreciate that storage array controllers useful in deploying client-specific applications in a storage system utilizing redundant system resources according to embodiments of the present disclosure may include additional forms of computer memory such as flash memory.

The storage array controller (202) detailed in FIG. 2 includes an operating system (246) that is stored in RAM (246). Examples of operating systems useful in storage array controllers (202, 206) configured for deploying client-specific applications in a storage system utilizing redundant system resources according to embodiments of the present disclosure include UNIX™, Linux™, Microsoft Windows™, and others as will occur to those of skill in the art. The operating system (246) depicted in FIG. 2 may be embodied, for example, as system software that manages computer hardware and software resources on the storage array controller (202).

The storage array controller (202) detailed in FIG. 2 also includes an array operating environment (252) that is stored in RAM (252). The array operating environment (252) may be embodied as one or more modules of computer program instructions used to enable the storage array controller (202) to service access requests that are directed to the storage array (220). The array operating environment (252) may be responsible for generating I/O requests (e.g., read requests, write requests) that are sent to the storage devices (216) or the write buffer devices (218). The array operating environment (252) may be further configured to perform various functions that result in more efficient utilization of the resources within the storage array (220). The array operating environment (252) may be configured, for example, to compress data prior to writing the data to one of the storage devices (216), to perform data deduplication operations, to pool data that is to be written to one of the storage devices (216) so that data may be written in blocks of a predetermined size, and so on.

The storage array controller (202) detailed in FIG. 2 also includes an application deployment module (256), a module that includes computer program instructions useful in deploying client-specific applications in a storage system utilizing redundant system resources according to embodiments of the present disclosure. The application deployment module (256) may be useful in deploying client-specific applications in a storage system utilizing redundant system resources, as the application deployment module (256) may, when executing, be configured to carry out the steps of: identifying a redundant controller in the storage system, wherein the storage system includes at least a first controller and the redundant controller; executing, within one or more containers, one or more applications on the redundant controller; executing, on the redundant controller, a virtual interface for accessing one or more storage devices in the storage system; generating, by one of the applications, an I/O operation directed to the storage system; servicing, by the redundant controller, the I/O operation via the virtual interface; determining whether a redundant controller of a second storage array can be utilized to execute one or more applications for a first storage array; executing one or more applications for the first storage array on the redundant controller of the second storage array in response to determining that the redundant controller of the second storage array can be utilized to execute one or more applications for the first storage array; determining whether the storage system is failing over from the first controller to the redundant controller; responsive to determining that the storage system is failing over from the first controller to the redundant controller: ceasing execution of one or more of the applications on the redundant controller and executing one or more of the applications on the first controller; determining, for each of a plurality of applications, a priority level; determining which applications to execute in dependence upon the priority level for each of the plurality of applications; determining which applications to execute in dependence upon one or more policies; updating software one or more of the controllers without disruption to the applications executing in the container; and performing other functions as will be described in greater detail below.

The storage array controller (202) detailed in FIG. 2 also includes a plurality of host bus adapters (222, 224, 250) that are coupled to the computer processor (240) via a data communications link (230, 232, 258). Each host bus adapter (222, 224, 250) may be embodied as a module of computer hardware that connects the host system (i.e., the storage array controller) to other network and storage devices. Each of the host bus adapters (222, 224, 250) of FIG. 2 may be embodied, for example, as a Fibre Channel adapter that enables the storage array controller (202) to connect to a SAN, as a Target Channel Adapter, as a SCSI/Storage Target Adapter, and so on. The storage array controller also includes a plurality of Ethernet adapters (226, 228) that enables the storage array controller (202) to connect to a LAN, although readers will appreciate that other types of network adapters may be utilized in accordance with embodiments of the present disclosure. Each of the host bus adapters (222, 224, 250) and Ethernet adapters (226, 228) may be coupled to the computer processor (240) via a data communications link (230, 232, 234, 236, 258) such as, for example, a PCIe bus.

The storage array controller (202) detailed in FIG. 2 also includes a switch (254) that is coupled to the computer processor (240) via a data communications link (248). The switch (254) of FIG. 2 may be embodied as a computer hardware device that can create multiple endpoints out of a single endpoint, thereby enabling multiple devices to share what was initially a single endpoint. The switch (254) of FIG. 2 may be embodied, for example, as a PCIe switch that is coupled to a PCIe bus and presents multiple PCIe connection points to the midplane (210).

The storage array controller (202) of FIG. 2 may also include a data communications link (242) for coupling the storage array controller (202) to other storage array controllers (206). Such a data communications link (242) may be embodied, for example, as a QuickPath Interconnect ('QPI') interconnect, as PCIe non-transparent bridge ('NTB') interconnect, and so on. Readers will recognize that components, protocols, adapters, and architectures described above are for illustration only, not limitation. Such a storage array controller may be implemented in a variety of different ways, each of which is well within the scope of the present disclosure.

Figure 3:
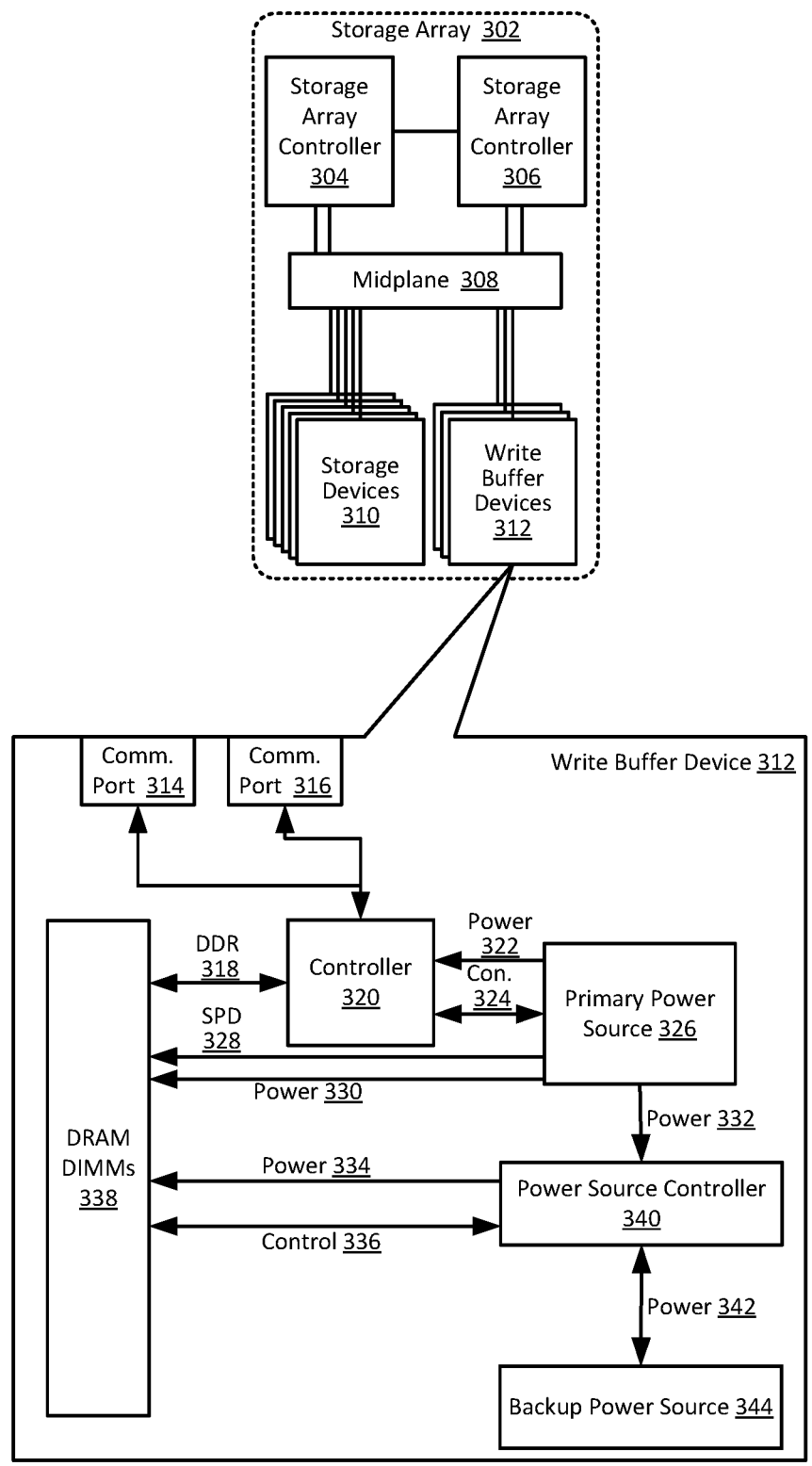
FIG. 3 sets forth a block diagram illustrating a write buffer device useful in deploying client-specific applications in a storage system utilizing redundant system resources according to embodiments of the present invention.

For further explanation, FIG. 3 sets forth a block diagram illustrating a write buffer device (312) useful in deploying client-specific applications in a storage system utilizing redundant system resources according to embodiments of the present invention. The write buffer device (312) depicted in FIG. 3 is similar to the write buffer devices depicted in FIG. 1 and FIG. 2. The write buffer device (312) may be included in a storage array (302) that includes a plurality of storage array controllers (304, 306) that are communicatively coupled to a plurality of storage devices (310) and also communicatively coupled to a plurality of write buffer devices (312) via a midplane (308).

The write buffer device (312) depicted in FIG. 3 includes two data communications ports (314, 316). The data communications ports (314, 316) of FIG. 3 may be embodied, for example, as computer hardware for communicatively coupling the write buffer device (312) to a storage array controller (304, 306) via the midplane (308). For example, the write buffer device (312) may be communicatively coupled to the first storage array controller (304) via a first data communications port (314) and the write buffer device (312) may also be communicatively coupled to the second storage array controller (306) via a second data communications port (316). Although the write buffer device (312) depicted in FIG. 3 includes two data communications ports (314, 316), readers will appreciate that write buffer devices useful for buffering data to be written to an array of non-volatile storage devices may include only one data communications port or, alternatively, additional data communications ports not depicted in FIG. 3.

The write buffer device (312) depicted in FIG. 3 also includes a controller (320). The controller (320) depicted in FIG. 3 may be embodied, for example, as computer hardware for receiving memory access requests (e.g., a request to write data to memory in the write buffer device) via the data communications ports (314, 316) and servicing such memory access requests. The controller (320) depicted in FIG. 3 may be embodied, for example, as an ASIC, as a microcontroller, and so on. The controller (320) depicted in FIG. 3 may be communicatively coupled the data communications ports (314, 316), for example, via a PCIe data communications bus.

The write buffer device (312) depicted in FIG. 3 also includes a plurality of DRAM memory modules, embodied in FIG. 3 as DRAM dual in-line memory modules ('DIMMs') (338). The DRAM DIMMs (338) depicted in FIG. 3 may be coupled to the controller (320) via a memory bus such as a DDR (318) memory bus such that the controller (320) can be configured to write data to the DRAM DIMMs (338) via the DDR (318) memory bus.

The write buffer device (312) depicted in FIG. 3 also includes a primary power source (326). The primary power source (326) may be embodied as computer hardware for providing electrical power to the computing components that are within the write buffer device (312). The primary power source (326) may be embodied, for example, as a switched-mode power supply that supplies electric energy to an electrical load by converting alternating current ('AC') power from a mains supply to a direct current (DC') power, as a DC-to-DC converter that converts a source of direct current (DC) from one voltage level to another, and so on. The primary power source (326) of FIG. 3 is coupled to the controller (320) via a power line (322) that the primary power source (326) can use to deliver power to the controller (320). The primary power source (326) of FIG. 3 is also coupled to the DRAM DIMMs (338) via a power line (330) that the primary power source (326) can use to deliver power to the DRAM DIMMs (338). The primary power source (326) of FIG. 3 is also coupled to a power source controller (340) via a power line (332) that the primary power source (326) can use to deliver power to the power source controller (340). The primary power source (326) can monitor which components are receiving power through the use of one or more control lines (324), serial presence detect ('SPD') lines (328), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (326).

The write buffer device (312) depicted in FIG. 3 also includes a backup power source (344). The backup power source (344) depicted in FIG. 3 represents a power source capable of providing power to the DRAM DIMMs (338) in the event that the primary power source (326) fails. In such a way, the DRAM DIMMs (338) may effectively serve as non-volatile memory, as a failure of the primary power source (326) will not cause the contents of the DRAM DIMMs (338) to be lost because the DRAM DIMMs (338) will continue to receive power from the backup power source (344). Such a backup power source (344) may be embodied, for example, as a supercapacitor.

The write buffer device (312) depicted in FIG. 3 also includes a power source controller (340). The power source controller (340) depicted in FIG. 3 may be embodied as a module of computer hardware configured to identify a failure of the primary power source (326) and to cause power to be delivered to the DRAM DIMMs (338) from the backup power source (344). In such an example, power may be delivered to the DRAM DIMMs (338) from the backup power source (344) via a first power line (342) between the power source controller (340) and the backup power source (344), as well as a second power line (334) between the backup power source controller (340) and the DRAM DIMMs (338). The backup power source controller (340) depicted in FIG. 3 may be embodied, for example, as an analog circuit, an ASIC, a microcontroller, and so on. The power source controller (340) can monitor whether the DRAM DIMMs (338) have power through the use of one or more control lines (336) that may be coupled to the DRAM DIMMs (338), as well as one or more control lines that may be coupled to the primary power source (326). In such an example, by exchanging signals between the DRAM DIMMs (338), the primary power source (326), and the power source controller (340), the power source controller (340) may identify whether power is being provided to the DRAM DIMMs (338) by the primary power source (326).

In the example depicted in FIG. 3, the controller (320) may be configured to receive, from a storage array controller (304, 306) via the one or more data communications ports (314, 316), an instruction to write data to the one or more DRAM DIMMs (338). Such an instruction may include, for example, the location at which to write the data, the data to be written to the DRAM DIMMs (338), the identity of the host that issued the instruction, the identity of a user associated with the instruction, or any other information needed to service the instruction. In the example depicted in FIG. 3, the NVRAM controller (320) may be further configured to write the data to the one or more DRAM DIMMs (338) in response to receiving such an instruction.

In the example depicted in FIG. 3, the controller (320) may be further configured to send an acknowledgment indicating that the data has been written to the array (302) of non-volatile storage devices in response to writing the data to the one or more DRAM DIMMs (338). The controller (320) may send the acknowledgment indicating that the data has been written to the array (302) of non-volatile storage devices in response to writing the data to the DRAM DIMMs (338) in the write buffer device (312). Readers will appreciate that although some forms of DRAM DIMMs (338) are considered to be volatile memory, because the DRAM DIMMs (338) are backed by redundant power sources (326, 344), writing the data to the DRAM DIMMs (338) in the write buffer device (312) may be treated the same as writing the data to traditional forms of non-volatile memory such as the storage devices (310). Furthermore, the DRAM DIMMs (338) in the write buffer device (312) can include one or more NVDIMMs. As such, once the data has been written to the DRAM DIMMs (338) in the write buffer device (312), an acknowledgement may be sent indicating that the data has been safely and persistently written to the array (302) of non-volatile storage devices.

In the example depicted in FIG. 3, the controller (320) may be further configured to determine whether the primary power source (326) has failed. The controller (320) may determine whether the primary power source (326) has failed, for example, by receiving a signal over the control line (324) indicating that the primary power source (326) has failed or is failing, by detecting a lack of power from the primary power source (326), and so on. In such an example, the controller (320) may be coupled to the backup power source (344) or may have access to another source of power such that the controller (320) can remain operational if the primary power source (326) does fail.

In the example depicted in FIG. 3, the controller (320) may be further configured to initiate a transfer of data contained in the one or more DRAM DIMMs (338) to flash memory in the write buffer device (312) in response to determining that the primary power source (326) has failed. The controller (320) may initiate a transfer of data contained in the one or more DRAM DIMMs (338) to flash memory in the write buffer device (312), for example, by signaling an NVDIMM to write the data contained in the one or more DRAM DIMMs (338) to flash memory on the NVDIMM.

Figure 4:
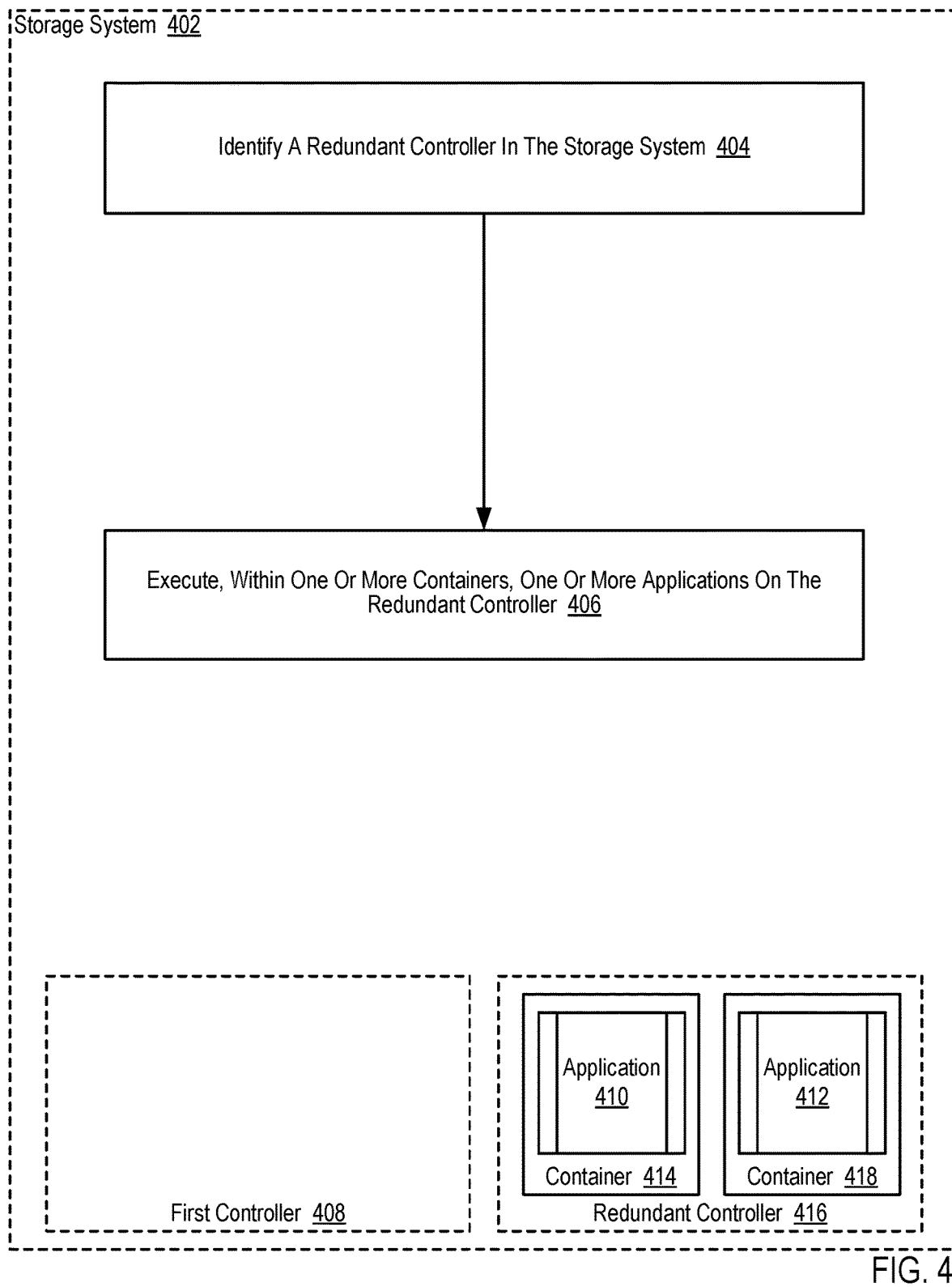
FIG. 4 sets forth a flow chart illustrating an example method for deploying client-specific applications utilizing redundant system resources in a storage system according to embodiments of the present disclosure.

For further explanation, FIG. 4 sets forth a flow chart illustrating an example method for deploying client-specific applications utilizing redundant system resources in a storage system (402) according embodiments of the present disclosure. For ease of illustration, the storage system (402) of FIG. 4 is depicted in less detail than the storage systems described above. Readers will appreciate, however, that the storage system (402) depicted in FIG. 4 may be similar to the storage systems described above with reference to FIGS. 1-3 as the storage system (402) can include a plurality of storage array controllers, write buffer devices, storage devices, and other components described above.

The storage system (402) depicted in FIG. 4 may include redundant system resources. The redundant system resources may be embodied, for examples, as duplicates of critical components within the storage system (402) that are in place to increase the reliability of the storage system (402). The storage system (402) depicted in FIG. 4 includes redundant storage array controllers, as the storage system includes at least a first controller (408) and a redundant controller (416), which may be similar to the storage array controllers described above with reference to FIG. 2. In the example method depicted in FIG. 4, the redundant controller (416) can serve as the passive controller in an active-passive pair of controllers, where the first controller (408) serves as the active controller. Readers will appreciate that while the first controller (408) and the redundant controller (416) may be part of an active-passive pair, such an embodiment is only one possible embodiment of the present disclosure. The first controller (408) and the redundant controller (416) may be part of an active-active pair or configured in some other manner, so long as there are redundant controllers.

In the example method depicted in FIG. 4, the redundant system resources such as the redundant controller (416) may be utilized to deploy one or more client-specific applications. The client-specific applications may be embodied as one or more modules of computer program instructions executing on computer hardware such as a computer processor. The client-specific applications may be separate from an array operating environment, such as the array operating environment described above with reference to FIG. 2, that is executing on the first controller (408) to service I/O requests from users of the storage system (402), write data to the storage devices in the storage system (402), read data from the storage devices in the storage system (402), perform garbage collection on the storage devices in the storage system (402), and perform other operations described above.

The example method depicted in FIG. 4 includes identifying (404) a redundant controller (416) in the storage system (402). In the example method depicted in FIG. 4, identifying (404) a redundant controller (416) in the storage system (402) may be carried out by the first controller (408), by the redundant controller (416), by a special purpose module that deploys client-specific applications (410, 412) in the storage system (402), by some other component of the storage system (402), or any combination thereof. Identifying (404) a redundant controller (416) in the storage system (402) may be carried out, for example, by sending a request to each controller (408, 416) in the storage system (402) to identify itself as an active controller or a passive controller, by examining configuration metadata that identifies each controller (408, 416) in the storage system (402) as being an active controller or a passive controller, or in in other ways as will occur to those of skill in the art in view of the teachings of the present disclosure.

The example method depicted in FIG. 4 also includes executing (406), within one or more containers (414, 418), one or more applications (410, 412) on the redundant controller (416). The one or more applications (410, 412) that are executed (406) on the redundant controller (416) may be embodied, for example, as client-specific applications that provide some feature or functionality that is specific to a particular client. As such, the one or more applications (410, 412) may provide some feature or functionality that is outside of the scope of the functionality provided by the array operating environment.

The applications (410, 412) depicted in FIG. 4 may be executed (406) within one or more containers (414, 418). The containers (414, 418) depicted in FIG. 4 may be embodied, for example, as an isolated virtualized environment where one or more applications can be run. The containers (414, 418) of FIG. 4 may be distinguished from other virtualized environments such as a virtual machine, as the containers (414, 418) may only include enough of an operating system and supporting programs and libraries necessary to run a specific program. As such, the containers (414, 418) do not require a full copy of an operating system, as well as virtual copies of all the hardware that the operating system needs to run, as is required with a virtual machine. Instead, containers focus on process isolation and containment instead of emulating a complete physical machine.

Executing (406) one or more applications (410, 412) within one or more containers (414, 418) on the redundant controller (416) may be carried out, for example, by creating a container (414, 418) that includes a particular application (410, 412), as well as the related libraries and binaries required to support the execution of the application (410, 412). In such an example, an instance such a container (414, 418) may be created through a command line interface or other interface that causes execution of the container (414, 418) to commence. Because the applications (410, 412) may be separate from an array operating environment and because the applications (410, 412) are executed on a redundant resource such as the redundant controller (416), executing such applications (410, 412) does not impact the performance of functions carried out by the array operating environment. As such, users of the storage system (402) will not experience a degradation in system performance (e.g., as measured in TOPS, write latency, and so on) as the result of executing the applications (410, 412). Such a degradation in system performance may be avoided given that redundant resources are utilized to execute the applications (410, 412), rather than utilizing system resources that also support the execution of the array operating environment.

Figure 5:
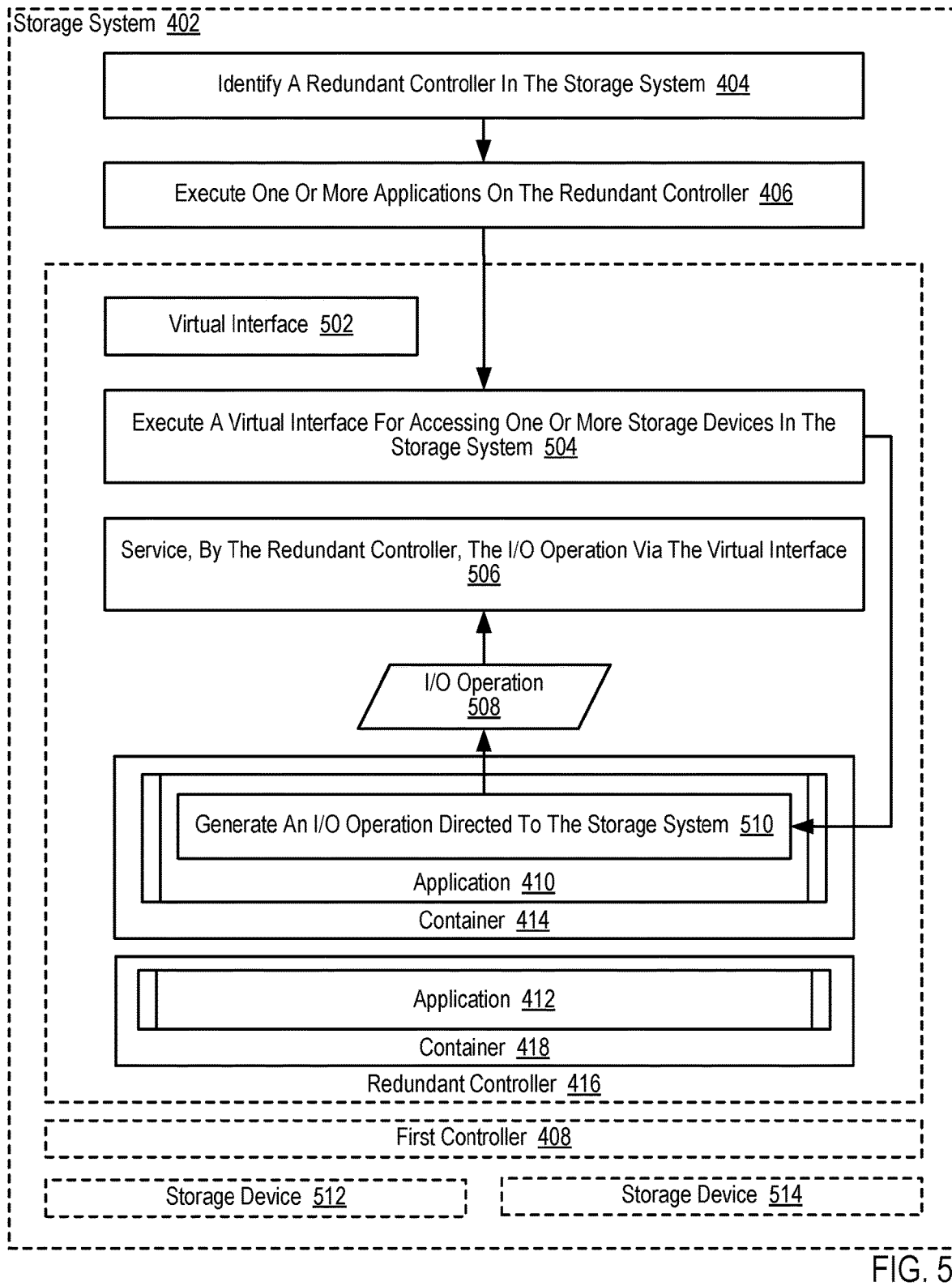
FIG. 5 sets forth a flow chart illustrating an additional example method for deploying client-specific applications utilizing redundant system resources in a storage system according to embodiments of the present disclosure.

For further explanation, FIG. 5 sets forth a flow chart illustrating an additional example method for deploying client-specific applications utilizing redundant system resources in a storage system (402) according embodiments of the present disclosure. The example method depicted in FIG. 5 is similar to the example method depicted in FIG. 4, as the example method depicted in FIG. 5 also includes identifying (404) a redundant controller (416) in the storage system (402) and executing (406) one or more applications (410, 412) on the redundant controller (416).

The example method depicted in FIG. 5 also includes executing (504), on the redundant controller (416), a virtual interface (502) for accessing one or more storage devices (512, 514) in the storage system (402). The virtual interface (502) for accessing one or more storage devices (512, 514) in the storage system (402) may be embodied, for example, as a module of computer program instructions executing on computer hardware such as a computer processor. The virtual interface (502) may be configured to utilize resources other than the first controller (408) to access the one or more storage devices storage devices (512, 514) in the storage system (402). The virtual interface (502) may be configured, for example, to utilize a remote direct memory access ('RDMA') engine that is provided by a network adapter in the redundant controller (416) to access the one or more storage devices storage devices (512, 514) in the storage system (402). Alternatively, the virtual interface (502) and the redundant controller (416) may be configured such that the virtual interface (502) can make use of the mechanisms within the redundant controller (416) that allow the redundant controller (416) to access storage devices (512, 514) in the storage system (402). In such an example, a small portion of the storage on one or more of the storage devices (512, 514) may be set aside for use by the virtual interface (502), such that the first controller (408) or any other controller that is operating as an active controller can be configured to avoid using the small portion of the storage on one or more of the storage devices (512, 514) that is set aside for use by the virtual interface (502).

The example method depicted in FIG. 5 also includes generating (510), by one of the applications (410, 412), an I/O operation (508) directed to the storage system (402). In the example method depicted in FIG. 5, one of the applications (410, 412) may generate (510) an I/O operation (508) directed to the storage system (402) as the application (410, 412) may need to store some information (e.g., parameter values, configuration information) related to the operation of the application (410, 412). The application (410, 412) may therefore be configured to generate (510) an I/O operation (508) directed to the storage system (402), where the I/O operation (508) represents a request to write the information that the application (410, 412) needs to store. When the application (410, 412) needs to retrieve such information, the application (410, 412) may be further configured to generate (510) an I/O operation (508) directed to the storage system (402), where the I/O operation (508) represents a request to read information previously stored on the storage system (402) by the application (410, 412).

The example method depicted in FIG. 5 also includes servicing (506), by the redundant controller (416), the I/O operation (508) via the virtual interface (502). The redundant controller (416) may service (506) the I/O operation (508) via the virtual interface (502), for example, by the application (410) sending the I/O operation (508) to the virtual interface (502). The virtual interface (502) could subsequently service the I/O operation (508) using an RDMA engine or other mechanism within the redundant controller (416) to access storage devices (512, 514).

Figure 6:
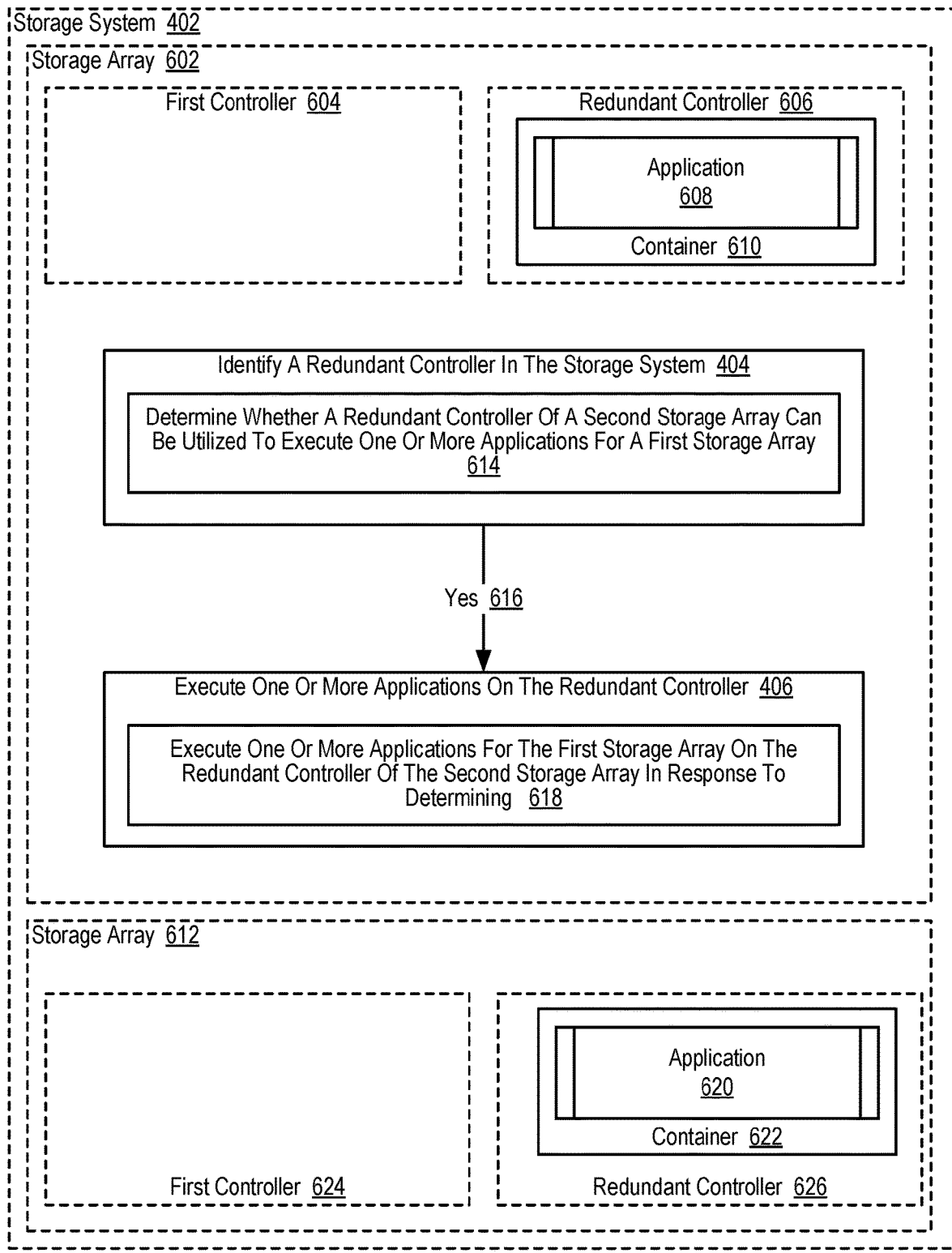
FIG. 6 sets forth a flow chart illustrating an additional example method for deploying client-specific applications utilizing redundant system resources in a storage system according embodiments of the present disclosure.

For further explanation, FIG. 6 sets forth a flow chart illustrating an additional example method for deploying client-specific applications utilizing redundant system resources in a storage system (402) according embodiments of the present disclosure. The example method depicted in FIG. 6 is similar to the example method depicted in FIG. 4, as the example method depicted in FIG. 6 also includes identifying (404) a redundant controller (606, 626) in the storage system (402) and executing (406) one or more applications (608, 620) on the redundant controller (606).

The example storage system (402) depicted in FIG. 6 includes a plurality of storage arrays (602, 612). Each of the storage arrays (602, 612) depicted in FIG. 6 may be similar to the storage arrays described above with reference to FIG.

1, as each storage array (602, 612) may include at least two controllers (604, 606, 624, 626). More specifically, each storage array (602, 612) depicted in FIG. 6 can include a first controller (604, 624) and a redundant controller (606, 626), where the redundant controllers (606, 626) may be embodied as passive controllers as described above with reference to FIG. 1. Readers will appreciate, however, that embodiments of the present disclosure are not limited to embodiments in which one controller is active and the other controller is passive.

In the example method depicted in FIG. 6, identifying (404) a redundant controller (606, 626) in the storage system (402) can include determining (614) whether a redundant controller (626) of the second storage array (612) can be utilized to execute one or more applications (620) for the first storage array (602). Determining (614) whether the redundant controller (626) of the second storage array (612) can be utilized to execute one or more applications (620) for the first storage array (602) may be carried out, for example, through data communications between the first storage array (602) and the second storage array (612). For example, an application deployment module executing on the first storage array (602) may be configured to send a request to an application deployment module executing on the second storage array (612). Such a request may include, for example, an identification of a particular application (620) whose execution on a redundant controller (626) in the second storage array (612) is requested, an estimation of the amount of computing resources that will be consumed by executing the particular application (620) on the redundant controller (626) in the second storage array (612), and so on. In response to such a request, an application deployment module executing on the second storage array (612) may evaluate the amount of computing resources available on the redundant controller (626) in the second storage array (612) and may subsequently issue a response to the application deployment module executing on the first storage array (602). If the application deployment module executing on the second storage array (612) determines that sufficient resources exist on the redundant controller (626) in the second storage array (612), the application deployment module executing on the second storage array (612) may send a response to the application deployment module executing on the first storage array (602) indicating that the redundant controller (626) in the second storage array (612) can execute the application (620). The application deployment module executing on the first storage array (602) may subsequently send the binaries and source code associated with the particular application (620) to the application deployment module executing on the second storage array (612).

In the example method depicted in FIG. 6, executing (406) one or more applications (608, 620) on the redundant controller (606, 626) can include executing (618) one or more applications (620) for the first storage array (602) on the redundant controller (626) of the second storage array (612). Executing (618) one or more applications (620) for the first storage array (602) on the redundant controller (626) of the second storage array (612) may be carried out, for example, by creating a container (622) on the redundant controller (626) of the second storage array (612), where the container (622) includes a particular client-specific application (612), as well as the related libraries and binaries required to support the execution of the client-specific application (612). In such an example, such a container (622) may be created through a command line interface or other interface that causes execution of the container (622) to commence, or in in other ways as will occur to those of skill in the art in view of the teachings of the present disclosure. Readers will appreciate that executing (618) the one or more applications (620) for the first storage array (602) on the redundant controller (626) of the second storage array (612) may be carried out only in response to affirmatively (616) determining (614) that the redundant controller (626) of the second storage array (612) can be utilized to execute one or more applications (620) for the first storage array (602).

Figure 7:
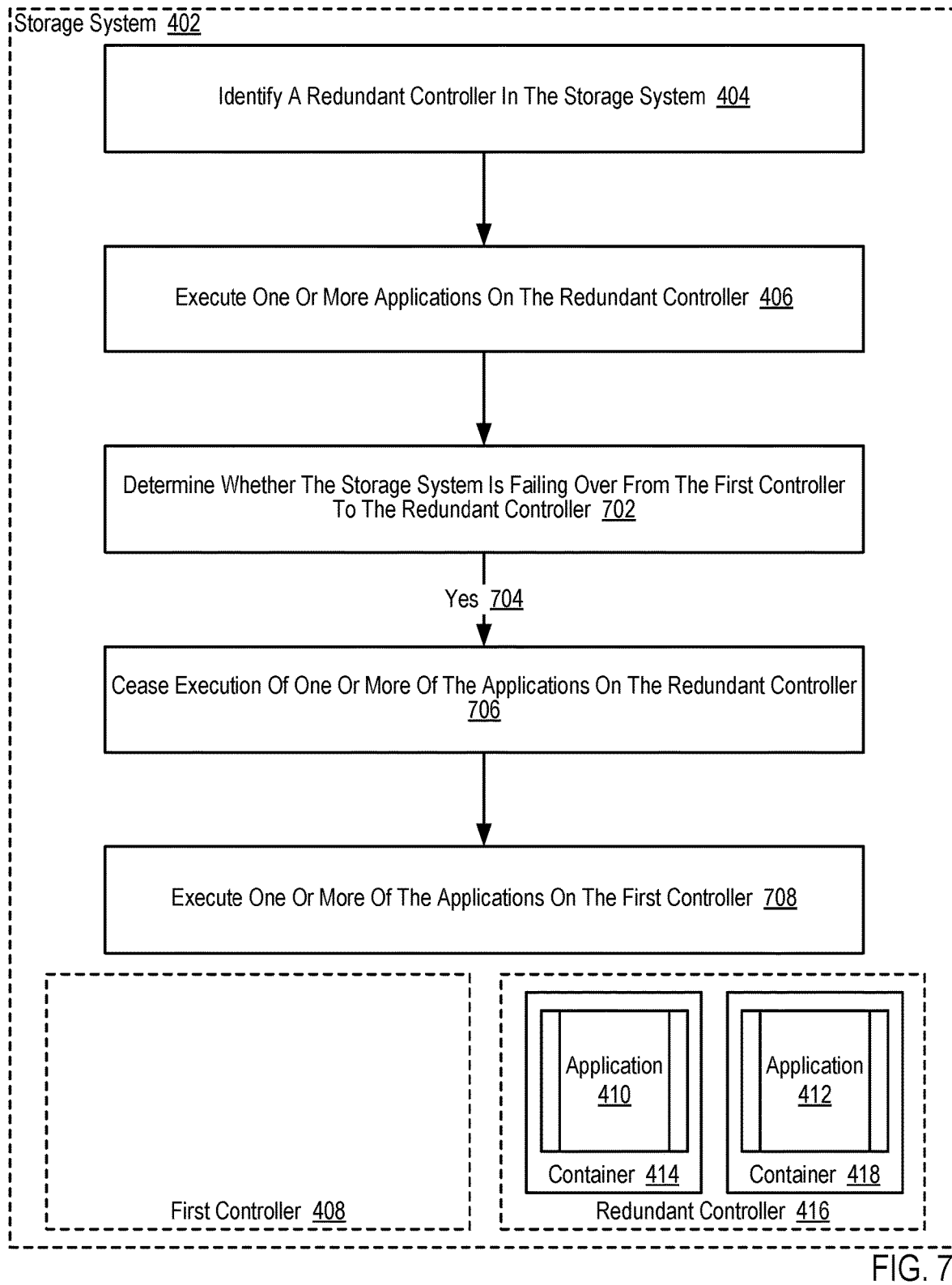
FIG. 7 sets forth a flow chart illustrating an additional example method for deploying client-specific applications utilizing redundant system resources in a storage system according embodiments of the present disclosure.

For further explanation, FIG. 7 sets forth a flow chart illustrating an additional example method for deploying client-specific applications utilizing redundant system resources in a storage system (402) according embodiments of the present disclosure. The example method depicted in FIG. 7 is similar to the example method depicted in FIG. 4, as the example method depicted in FIG. 7 also includes identifying (404) a redundant controller (416) in the storage system (402) and executing (406) one or more applications (410, 412) on the redundant controller (416).

The example method depicted in FIG. 7 also includes determining (702) whether the storage system (402) is failing over from the first controller (408) to the redundant controller (416). The storage system (402) may fail over from the first controller (408) to the redundant controller (416), for example, in response to the occurrence of a failure or error condition in the first controller (408). When the storage system (402) fails over from the first controller (408) to the redundant controller (416), the first controller (408) may become a passive controller while the redundant controller (416) becomes the active controller.

In the example method depicted in FIG. 7, determining (702) whether the storage system (402) is failing over from the first controller (408) to the redundant controller (416) may be carried out in a variety of ways. Determining (702) whether the storage system (402) is failing over from the first controller (408) to the redundant controller (416) may be carried out, for example, by determining whether the redundant controller (416) has received an instruction to transition into an active mode, by determining whether the first controller (408) has received an instruction to transition into a passive mode, by determining that a centralized data source that associates various controllers with a designation of the controller being an active controller or a passive controller has been modified to change the respective roles of the first controller (408) and the redundant controller (416), and so on. Alternatively, the storage system (402) may be configured such that a module that assists in failing over the storage system (402) from the first controller (408) to the redundant controller (416) may be configured to notify a module (e.g., the application deployment module described above with reference to FIG. 2) that assists in deploying client-specific applications utilizing redundant system resources that a fail over event is occurring prior to actually failing over the storage system (402) from the first controller (408) to the redundant controller (416).

In the example method depicted in FIG. 7, in response to affirmatively (704) determining that the storage system (402) is failing over from the first controller (408) to the redundant controller (416), the storage system (402) may cease (706) execution of one or more of the applications (410, 412) on the redundant controller (416). As described above, when the storage system (402) fails over from the first controller (408) to the redundant controller (416), the redundant controller (416) may serve as the active controller while the first controller (408) serves as the passive controller. When the redundant controller (416) does serve as the active controller, the redundant controller (416) may utilize an array operating environment as described above to service I/O requests from users of the storage system (402), write data to the storage devices in the storage system (402), read data from the storage devices in the storage system (402), perform garbage collection on the storage devices in the storage system (402), and perform other operations described above. In order to prevent the execution of the applications (410, 412) from impacting the performance of the functions that are carried out by the array operating environment, execution of one or more of the applications (410, 412) on the redundant controller (416) may cease (706).

In the example method depicted in FIG. 7, in further response to affirmatively (704) determining that the storage system (402) is failing over from the first controller (408) to the redundant controller (416), the storage system (402) may execute (708) one or more of the applications (410, 412) on the first controller (408). As described above, when the storage system (402) fails over from the first controller (408) to the redundant controller (416), the redundant controller (416) may serve as the active controller while the first controller (408) serves as the passive controller. When the first controller (408) does serve as the passive controller, the first controller (408) will not utilize an array operating environment as described above to service I/O requests from users of the storage system (402), write data to the storage devices in the storage system (402), read data from the storage devices in the storage system (402), perform garbage collection on the storage devices in the storage system (402), and perform other operations described above. Because the first controller (408) is not performing such functions, the one or more of the applications (410, 412) may be executed (708) on the first controller (408) without impacting the performance of the functions that are carried out by the array operating environment.

Figure 8:
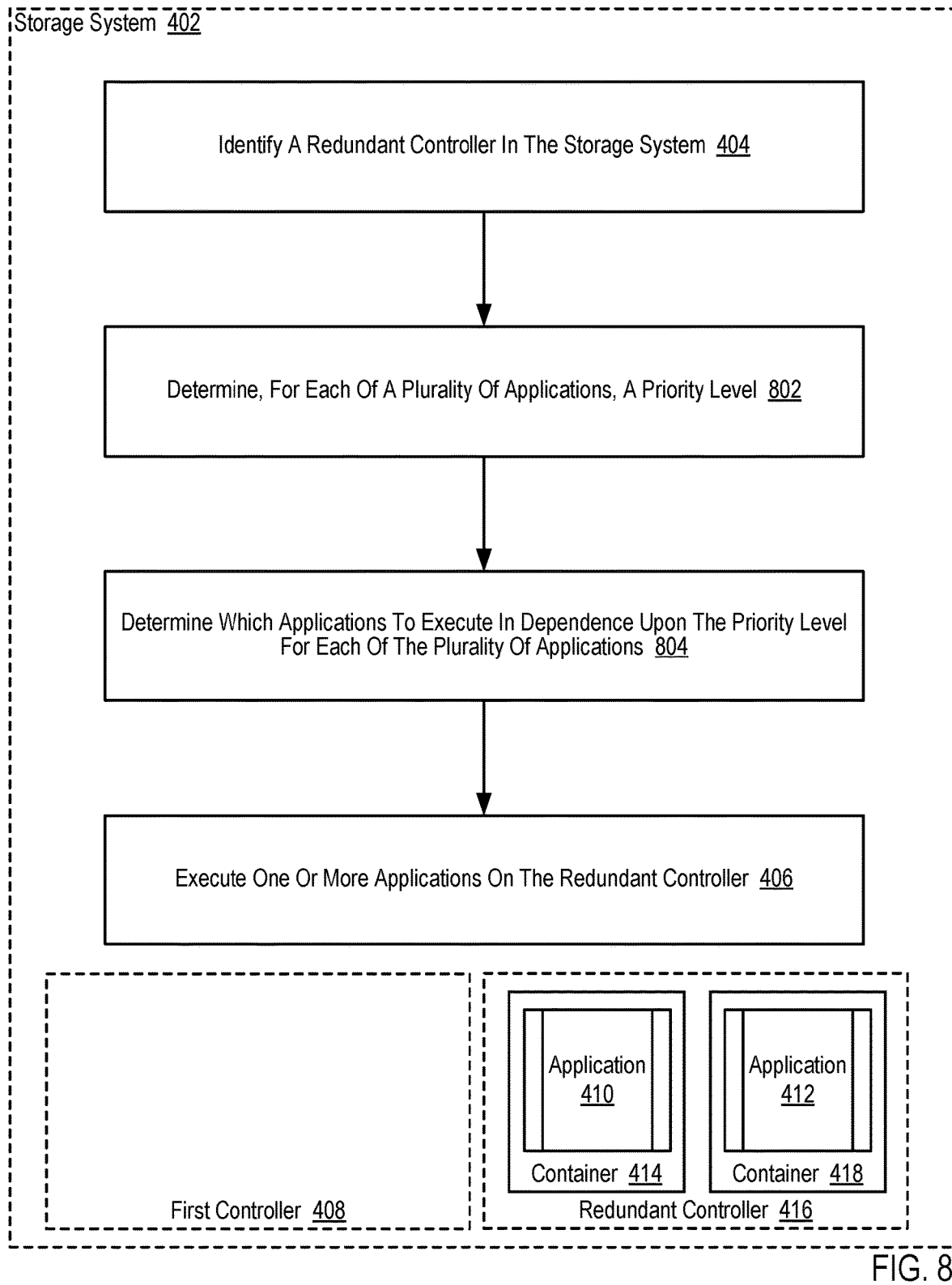
FIG. 8 sets forth a flow chart illustrating an additional example method for deploying client-specific applications utilizing redundant system resources in a storage system according embodiments of the present disclosure.

For further explanation, FIG. 8 sets forth a flow chart illustrating an additional example method for deploying client-specific applications utilizing redundant system resources in a storage system (402) according embodiments of the present disclosure. The example method depicted in FIG. 8 is similar to the example method depicted in FIG. 4, as the example method depicted in FIG. 8 also includes identifying (404) a redundant controller (416) in the storage system (402) and executing (406) one or more applications (410, 412) on the redundant controller (416).

The example method depicted in FIG. 8 also includes determining (802), for each of a plurality of applications (410, 412), a priority level. In the example method depicted in FIG. 4, each of a plurality of applications (410, 412) may be associated with a priority level that represents how critical it is that each of the applications (410, 412) be executed. The priority level may be embodied, for example, as a relative value where each application (410, 412) is ranked relative to all other applications (410, 412), as an absolute value where each application (410, 412) is given a specific priority score, and so on. The priority level may be established, for example, by a system administrator or other administrative entity. Such a system administrator or other administrative entity may decide, for example, that it is very important that a first application (410) be executed and that it is less important that a second application (412) be executed. In such an example, the system administrator or other administrative entity may assign a higher priority level to the first application (410) than the priority level that is assigned to the second application (412).

In the example method depicted in FIG. 8, determining (802) a priority level for each of a plurality of applications (410, 412) may be carried out by examining a centralized data repository (e.g., a list, a database) that associates the priority level associated with each application (410, 412) with an identifier for each application (410, 412). Such a centralized data repository may be established by a system administrator or other administrative and may be updated as new applications are created. In an alternative embodiment, each application may include a configuration parameter that identifies its own priority, such that determining (802) a priority level for each of a plurality of applications (410, 412) may be carried out by requesting such information from each currently executing application.

The example method depicted in FIG. 8 also includes determining (804) which applications (410, 412) to execute in dependence upon the priority level for each of the plurality of applications (410, 412). Determining (804) which applications (410, 412) to execute in dependence upon the priority level for each of the plurality of applications (410, 412) may be carried, for example, by iteratively determining whether the redundant controller (416) has sufficient resources available to execute the application with the highest priority that is not currently executing. If the redundant controller (416) has sufficient resources to execute the application with the highest priority that is not currently executing, the redundant controller (416) may subsequently begin executing the application with the highest priority that is not currently executing.

Figure 9:
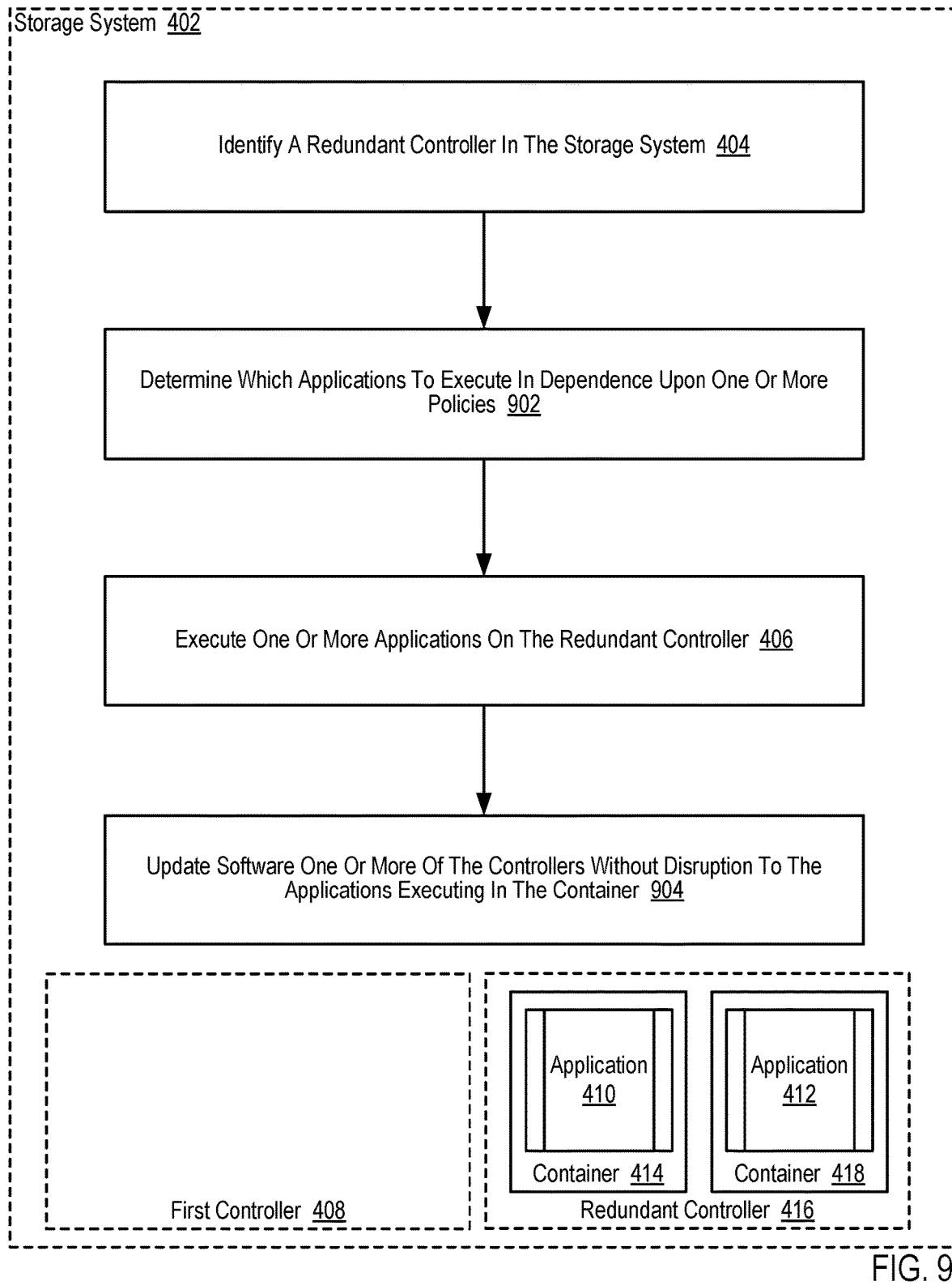
FIG. 9 sets forth a flow chart illustrating an additional example method for deploying client-specific applications utilizing redundant system resources in a storage system according embodiments of the present disclosure.

For further explanation, FIG. 9 sets forth a flow chart illustrating an additional example method for deploying client-specific applications utilizing redundant system resources in a storage system (402) according embodiments of the present disclosure. The example method depicted in FIG. 9 is similar to the example method depicted in FIG. 4, as the example method depicted in FIG. 9 also includes identifying (404) a redundant controller (416) in the storage system (402) and executing (406) one or more applications (410, 412) on the redundant controller (416).

The example method depicted in FIG. 9 also includes determining (902) which applications (410, 412) to execute in dependence upon one or more policies. The one or more policies may be embodied, for example, as a service level agreement that guarantees that one or more particular applications will be executed when the storage system (402) is operational. In such an example, the execution of the one or more particular applications identified in such a policy may be prioritized over the execution of other applications. Readers will appreciate that other types of policies may be utilized to determine (902) which applications (410, 412) to execute. For example, a system administrator or other user may create a custom policy that is used to determine (902) which applications (410, 412) to execute.

The example method depicted in FIG. 9 also includes updating (904) software one or more of the controllers (408, 416) without disruption to the applications (410, 412) executing in the container (414, 418). In the example method depicted in FIG. 9, the software that is to be updated (904) may include the applications (410, 412) that are executing on the redundant controller (416), or other applications on the controllers (408, 416), including applications such as the application deployment module and the array operating environment described above with reference to FIG. 2.

In the example method depicted in FIG. 9, the software on one or more of the controllers (408, 416) may be updated (904) without disruption to the applications (410, 412)

executing in the container (414, 418). In an example where the applications (410, 412) themselves are being updated (904), such an update may occur without disruption to the applications (410, 412) executing in the container (414, 418) by creating a new container, deploying the updated version of the application in the new container, and destroying the container (414, 418) that was executing the previous version of the application. In an example where other applications are being updated, such an update need not interfere with the applications (410, 412) that are executing in the container (414, 418), as the applications (410, 412) that are executing in the container (414, 418) are not being modified.

Example embodiments of the present invention are described largely in the context of a fully functional computer system for managing I/O queues in a data storage system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing high availability to client-specific applications executing in a storage system, the method comprising:
    identifying a redundant controller in the storage system, wherein the storage system includes at least a first controller and the redundant controller, wherein:
        the first controller and the redundant controller each receive, via a network, I/O operations directed to the storage system;
        the redundant storage controller directs I/O operations received via the network to the first controller; and
        the first controller services received I/O operations by issuing I/O operations to one or more of the storage devices;
    executing, within one or more containers, one or more applications on the redundant controller.

2. The method of claim 1 further comprising:
    executing, on the redundant controller, a virtual interface for accessing one or more storage devices in the storage system;
    generating, by one of the applications, an I/O operation directed to the storage system; and
    servicing, by the redundant controller, the I/O operation via the virtual interface.

3. The method of claim 1, wherein:
    the storage system includes a plurality of storage arrays;
    identifying a redundant controller in the storage system further comprises determining whether a redundant controller of a second storage array can be utilized to execute one or more applications for a first storage array; and
    executing one or more applications on the redundant controller further comprises executing one or more applications for the first storage array on the redundant controller of the second storage array in response to determining that the redundant controller of the second storage array can be utilized to execute one or more applications for the first storage array.

4. The method of claim 1 further comprising:
    determining, for each of a plurality of applications, a priority level; and
    determining which applications to execute in dependence upon the priority level for each of the plurality of applications.

5. The method of claim 1 further comprising determining which applications to execute in dependence upon one or more policies.

6. The method of claim 1 further comprising updating software one or more of the controllers without disruption to the applications executing in the container.

7. A apparatus for providing high availability to client-specific applications executing in a storage system, the apparatus comprising a computer processor and a computer memory, the computer memory including computer program instructions that, when executed by the computer processor, cause the apparatus to carry out the steps of:
    identifying a redundant controller in the storage system, wherein the storage system includes at least a first controller and the redundant controller, wherein:
        the first controller and the redundant controller each receive, via a network, I/O operations directed to the storage system;
        the redundant storage controller directs I/O operations received via the network to the first controller; and
        the first controller services received I/O operations by issuing I/O operations to one or more of the storage devices;
    executing, within one or more containers, one or more applications on the redundant controller.

8. The apparatus of claim 7 further comprising computer program instructions that, when executed by the computer processor, cause the apparatus to carry out the steps of:
    executing, on the redundant controller, a virtual interface for accessing one or more storage devices in the storage system;
    generating, by one of the applications, an I/O operation directed to the storage system; and
    servicing, by the redundant controller, the I/O operation via the virtual interface.

9. The apparatus of claim 7, wherein:
    the storage system includes a plurality of storage arrays;
    identifying a redundant controller in the storage system further comprises determining whether a redundant controller of a second storage array can be utilized to execute one or more applications for a first storage array; and
    executing one or more applications on the redundant controller further comprises executing one or more applications for the first storage array on the redundant controller of the second storage array in response to determining that the redundant controller of the second storage array can be utilized to execute one or more applications for the first storage array.

10. The apparatus of claim 7 further comprising computer program instructions that, when executed by the computer processor, cause the apparatus to carry out the steps of:
determining, for each of a plurality of applications, a priority level; and
determining which applications to execute in dependence upon the priority level for each of the plurality of applications.

11. The apparatus of claim 7 further comprising computer program instructions that, when executed by the computer processor, cause the apparatus to carry out the step of determining which applications to execute in dependence upon one or more policies.

12. The apparatus of claim 7 further comprising computer program instructions that, when executed by the computer processor, cause the apparatus to carry out the step of updating software one or more of the controllers without disruption to the applications executing in the container.

13. A computer program product for providing high availability to client-specific applications executing in a storage system, the computer program product disposed upon a computer readable medium, the computer program product comprising computer program instructions that, when executed, cause a computer to carry out the steps of:
identifying a redundant controller in the storage system, wherein the storage system includes at least a first controller and the redundant controller, wherein:
the first controller and the redundant controller each receive, via a network, I/O operations directed to the storage system;
the redundant storage controller directs I/O operations received via the network to the first controller; and
the first controller services received I/O operations by issuing I/O operations to one or more of the storage devices;
executing, within one or more containers, one or more applications on the redundant controller.

14. The computer program product of claim 13 further comprising computer program instructions that, when executed, cause the computer to carry out the steps of:
executing, on the redundant controller, a virtual interface for accessing one or more storage devices in the storage system;
generating, by one of the applications, an I/O operation directed to the storage system; and
servicing, by the redundant controller, the I/O operation via the virtual interface.

15. The computer program product of claim 13, wherein:
the storage system includes a plurality of storage arrays;
identifying a redundant controller in the storage system further comprises determining whether a redundant controller of a second storage array can be utilized to execute one or more applications for a first storage array; and
executing one or more applications on the redundant controller further comprises executing one or more applications for the first storage array on the redundant controller of the second storage array in response to determining that the redundant controller of the second storage array can be utilized to execute one or more applications for the first storage array.

16. The computer program product of claim 13 further comprising computer program instructions that, when executed, cause the computer to carry out the steps of:
determining, for each of a plurality of applications, a priority level; and
determining which applications to execute in dependence upon the priority level for each of the plurality of applications.

17. The computer program product of claim 13 further comprising computer program instructions that, when executed, cause the computer to carry out the step of determining which applications to execute in dependence upon one or more policies.

* * * * *